United States Patent [19]

Shimada et al.

[11] Patent Number: 5,738,720
[45] Date of Patent: Apr. 14, 1998

[54] METHOD OF MANUFACTURING MICROSTRUCTURE PATTERN OF MOLECULAR MATERIAL HIGH ORIENTATION AGGREGATE WITH THE AID OF DIFFERENCE OF GROWTH RATE BY SUBSTRATE MATERIAL

[75] Inventors: Toshihiro Shimada; Atsushi Koma, both of Tokyo, Japan

[73] Assignee: The University of Tokyo, Tokyo, Japan

[21] Appl. No.: 600,157

[22] Filed: Feb. 12, 1996

[30] Foreign Application Priority Data

Mar. 27, 1995 [JP] Japan ................................. 7-067476

[51] Int. Cl.⁶ ................................................. C30B 29/58
[52] U.S. Cl. .......................... 117/94; 117/101; 117/103; 117/106; 117/913; 117/925; 117/926; 117/927
[58] Field of Search .......................... 117/94, 101, 103, 117/106, 913, 925, 926, 927

[56] References Cited

U.S. PATENT DOCUMENTS

| 5,176,786 | 1/1993 | Debe | 117/925 |
|---|---|---|---|
| 5,180,470 | 1/1993 | Smith et al. | 117/925 |

FOREIGN PATENT DOCUMENTS

| 6-93422 | 4/1994 | Japan | 117/925 |
|---|---|---|---|
| 7-10698 | 1/1995 | Japan | 117/94 |

OTHER PUBLICATIONS

Sarma et al. "Epitoxy Versus Oriented Heterogeneous Nucleation of Organic Crystals on Ionic Substrates" Journal of Crystal Growth vol. 174 (1-4) 487-494 (1997).

*Primary Examiner*—Robert Kunemund
*Attorney, Agent, or Firm*—Sughrue, Mion, Zinn, Macpeak & Seas, PLLC

[57] ABSTRACT

The present invention aims to provide a method of manufacturing a microstructure pattern of a high orientation aggregate of organic molecular material by forming a fine pattern made by single crystal growing ionic material of another property on an ionic substrate by lithography and epitaxial growth, and forming a pattern made by organic molecular material having functionability to light on the fine pattern by utilizing dependence of substrate material of crystal growth rate in epitaxial growth, and is applied to the formation of a microstructure pattern of organic molecular material which can be utilized for optical waveguide, optical integrated circuit, non-linear optical element and laser resonator.

2 Claims, 4 Drawing Sheets

FIG_1 (A)
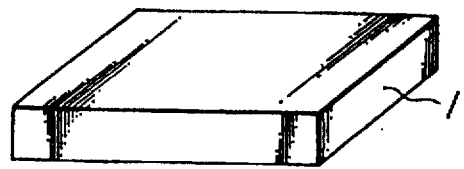
FIG_1 (B)
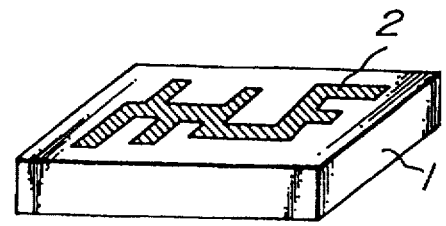
Molecular material beam
FIG_1 (C)
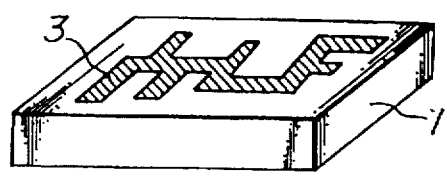
FIG_1 (D)
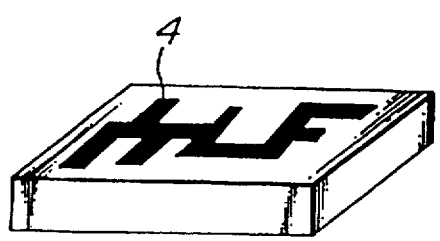
FIG_1 (E)
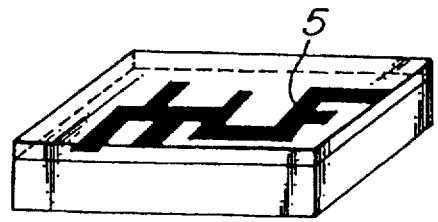

FIG._2 (A)
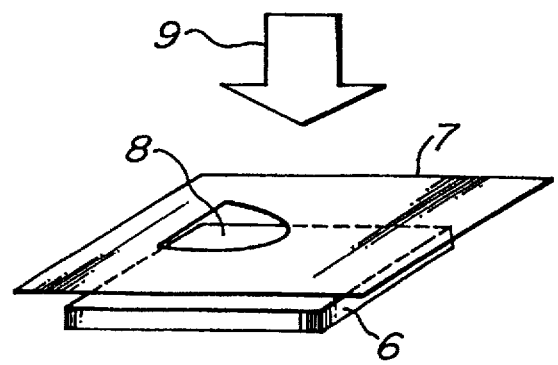
FIG._2 (B)
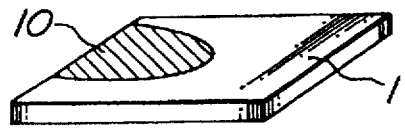
FIG._2 (C)
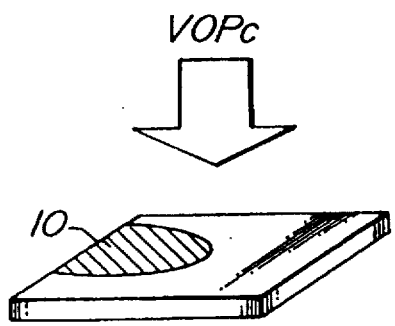
FIG._2 (D)
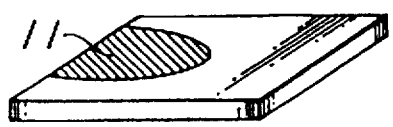

FIG_3
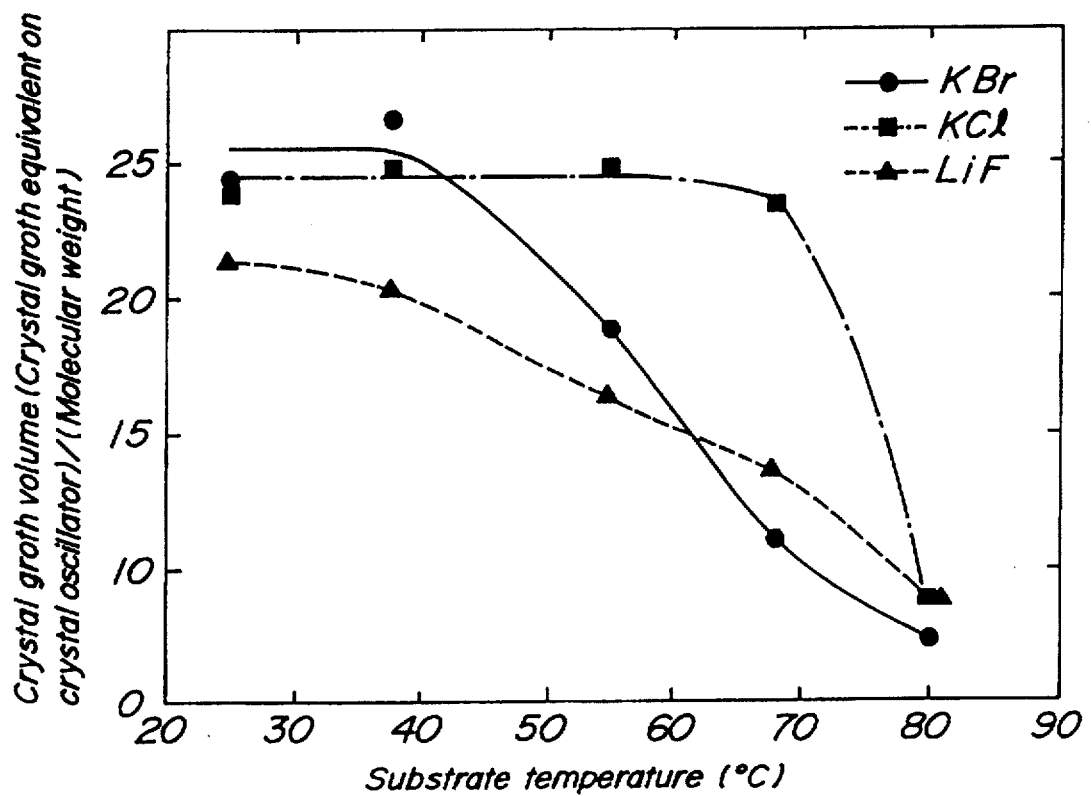

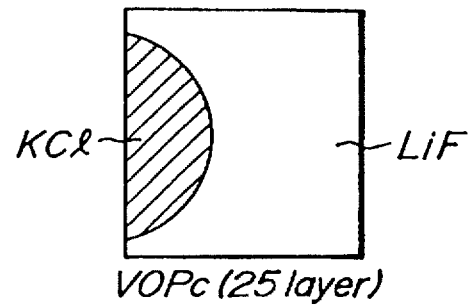
FIG._4 (A)
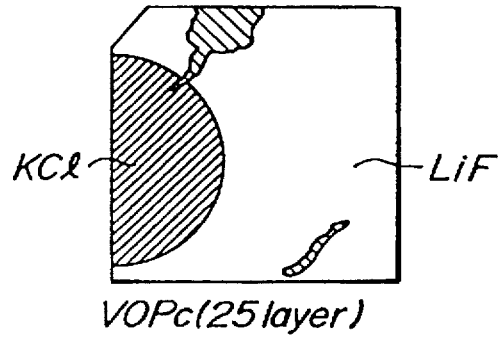
FIG._4 (B)

METHOD OF MANUFACTURING MICROSTRUCTURE PATTERN OF MOLECULAR MATERIAL HIGH ORIENTATION AGGREGATE WITH THE AID OF DIFFERENCE OF GROWTH RATE BY SUBSTRATE MATERIAL

BACKGROUND OF THE INVENTION

1. Field of the Invention

The present invention aims to provide a method of manufacturing the microstructure pattern of a high orientation aggregate of an organic molecular material for forming a microstructure pattern by single crystal growth of another ionic material on an ionic material substrate by lithography and epitaxial growth; and further epitaxially growing organic molecular material having functional characteristics for light on the microstructure pattern with the aid of dependency of crystal growth rate on substrate material, and is applied to manufacture a microstructure pattern of organic molecular material applicable to optical waveguide, light integrated circuit, non-linear optical element and laser resonator.

2. Related Art Statement

Technique for manufacturing the fine pattern of an aggregate highly ordered (i.e. highly oriented) molecules having optical functions such as strong light absorption, non-linear optical effect and the like is extremely important for manufacturing future optical elements such as optical waveguide, non-linear optical element, light integrated circuit and the like.

However, such technique is hardly materialized at present, and still under fundamental study of patterning by lithography and photochemical reaction on continuous lines of the prior semiconductor technique. Such means limits paternable molecular material to chemical stability and reactivity, and it is impossible to have highly ordered aggregate by imparting essential molecular high orientation to the mutual action with light.

The above problem is due to the fact that molecular material is directly finely processed and formed on a substrate of ionic material. The present invention is achieved by avoiding this problem, greatly increasing kinds of microstructure-formable molecular materials, and aiming to form the microstructure pattern of a highly oriented and highly ordered aggregate having high crystal order represented by a single crystal with the aid of lithography and epitaxial growth.

The present inventors have found such a phenomenon of selective crystal growth that, in case of epitaxially growing molecular material in vacuo, the growth occurs on some substrate material by difference of affinities of the substrate material and growing molecular material within a substrate temperature region depending on combination of materials, but does not occur on another material. The present invention found the fact that by utilizing the phenomenon, it is enable to produce the microstructure pattern of a highly ordered aggregate of molecular material by uniformly irradiating a molecular beam of molecular material on the substrate surface patterned with more than two materials.

SUMMARY OF THE INVENTION

The present invention relates to a method of manufacturing the microstructure pattern of a high orientation aggregate of a molecular material with the aid of difference of growth rate with substrate material comprising: the first step of forming a microstructure pattern singly crystallized another ionic material having different ionic bondability thereon by lithography and epitaxial growth on a single crystal substrate material of an ionic material, and the second step of forming a microstructure pattern of a high orientation aggregate of an organic molecular material on a single crystal substrate of an ionic material by carrying out epitaxial growth of an objective organic molecular material, while maintaining a substrate temperature of the molecular material aiming at coating, in the pattern produced in said step, at the optimum temperature for growing on substrate material or either one material of grown ionic materials determined by combination of materials, and scarcely growing on the other ionic material.

Another object of the present invention is to provide a method of forming a microstructure pattern of a high orientation aggregate of a molecular material with the aid of difference of crystal growth rate of substrate material comprising the first step of forming a microstructure pattern singly crystallized another ionic material having different ionic bondability thereon by lithography and epitaxial growth on a single crystal substrate material of an ionic material, the second step of forming a microstructure pattern of a high orientation aggregate of an organic molecular material on a single crystal substrate of an ionic material by carrying out the epitaxial growth of an objective organic molecular material, while maintaining a substrate temperature of the molecular material aiming at coating, in the pattern manufactured in said step, at the optimum temperature for crystal growing on substrate material or either one material of grown ionic materials determined by combination of materials, and scarcely growing on the other material, and the third step of repeating said step of coating ionic material and molecular material on the microstructure pattern of said molecular material by epitaxial growth and forming three-dimensional structure.

A further object of the present invention is to provide a method of manufacturing the microstructure pattern of a high orientation aggregate of a molecular material comprising the third step of forming three-dimensional structure by repeating said step of coating ionic material and molecular material on the microstructure of the molecular material formed by epitaxial growth in the above first and second steps.

In the present invention, an ion material indicates a material consisting of more than two different elements and mixed crystal thereof, wherein one to three electrons per atom move from one constituent element to the other element to become cation and anion, respectively, and a crystal is formed by static electricity between the cation and the anion. Moreover, there is such a characteristic that plus and minus loads are regularly arranged on the clean surface obtained by cleavage or heating of the ionic material by every atom.

The ionic materials are illustrated by the following materials.

(1) Alkali halide such as NcAl, LiF, $KCl_xBr_{1-x}$, $K_xRb_{1-x}Cl$ and the like and the mixed crystal thereof.

(2) Alkali earth halide such as $CaF_2$, $SrF_2$, $BaF_2$, $Ca_xSr_{1-x}F_2$ and the like and the mixed crystal thereof.

(3) Alkali earth oxide such as MgO, SrO, BaO, $Mg_xSr_{1-x}O$ and the like and the mixed crystal thereof.

(4) Group III metallic element oxide such as $Al_2O_3$, $In_2O_3$, $Al_xIn_{2-x}O_3$ and the like and the mixed crystal thereof.

(5) Group IV metallic element oxide such as $TiO_2$, $ZrO_2$, $Ti_xZr_{1-x}O_2$ and the like and the mixed crystal thereof.

(6) Silver halide such as AgCl, AgBr, $AgCl_xBr_{1-x}$ and the like and the mixed crystal thereof.

(7) Copper halide such as CuCl, CuBr, $CuCl_xBr_{1-x}$ and the like and the mixed crystal thereof.

(8) Perovskite oxide such as $SrTiO_3$, $BaTiO_3$, $KNbO_3$, $L_1TaO_3$, $Sr_xBa_{1-x}TiO_3$ and the like and the mixed crystal thereof.

(9) Chalcopyrite crystal such as $CuFeS_3$ and the like and the mixed crystal thereof.

In the present invention, "organic molecular material" means a material having a crystalline structure in which organic molecules are bonded by Van der Waals force, and the organic molecular materials are illustrated.

(1) Molecule obtained by substituting hydrocarbons formed by bonding benzene ring such as benzene ($C_6H_6$), naphthalene ($C_{10}H_8$), anthracene ($C_{14}H_{10}$), perylene ($C_{20}M_{12}$), coronene ($C_{24}H_{12}$) and the like and their hydrogen atoms by substituted groups consisting of less than four atoms.

(2) Molecule obtained by substituting quinones substituted two hydrogen atoms of benzene nucleus of (1) of perylene-3,4,9,10-tetracarboxylic-dianhydride (abbreviated as PTCDA) and perylene-3,4,9,10-tetracarboxylic-diimide (abbreviated as PTCDI) by two oxygen atoms and their hydrogen atoms substituted by substituted groups consisting of less than four atoms.

(3) Molecule obtained by substituting metallic phthalocyanines and their hydrogen atoms substituted by substituted groups consisting of less than four atoms.

(4) Molecule conjugately bonded benzene ring ($C_6H_6$) to porphylene ring ($C_{20}H_{12}N_4$) such as metallic porphyne ($MC_{20}H_{12}N_4$, where M is a metal or $H_2$ and a metal of Group III represented by metal element AlCl and vanadium halide or vanadium oxide) and a metallic tetrabenzoporphyne ($MC_{36}H_{20}N_4$) and a molecule formed by coordinating metal therewith, and molecule obtained by substituting their hydrogen atoms by substituting groups consisting of less than four atoms.

(5) Molecule represented by the chemical formula of $C_nH_m$-COOH and obtained by substituting a straight chain monovalent fatty acid and its hydrogen atom by halogen.

(6) Alkali earth salt and cadmium salt represented by the chemical formulae such as $Ca(C_pH_qX_rCOO)_2$, $Sr(C_pH_qX_rCOO)_2$, $Cd(C_pH_qX_rCOO)_2$ and the like.

(7) Furalene such as $C_{60}$, $C_{70}$, $C_{84}$ and the like.

(8) Charge-transfer complex having TTCh (tetrachalcofulvalene) skeleton, tetracyanoquinodimethane and its halogen substituted body as electron acceptor molecule.

(9) Squaric acid represented by the chemical formula of $C_4H_2O_4$.

In the present invention, an ionic material used as a substrate and an ionic material used for coating the substrate by lithography and epitaxial growth should be different from organic molecular material coated thereon in bondability.

Difference of this property means to select and use such material that the organic molecular material is bonded or coated with one ionic material substrate, but to select and use another property which is not bonded or coated on a pattern of the other ionic material.

A method of manufacturing a microstructure pattern of the present invention is explained by referring to batik dyed on paper. That is, an ionic material substrate corresponds to paper or cloth to be dyed, the coating the other ionic material having a different property thereon corresponds to manufacturing a fine pattern with wax, and an organic molecular material corresponds to pigment or dye for forming a fine design or pattern.

That is, an epitaxial growth of the object organic molecular material is carried out to form a microstructure pattern of a high orientation aggregate of organic molecular material on a single crystal substrate of ionic material by maintaining a substrate temperature at the optimum temperature for growing on a substrate material or either one of grown ionic materials determined by combination of materials, and scarcely growing on the other ionic material.

As another example of the organic molecular material, use can be made of $C_4H_2O_4$ and the like called as squaric acid. This organic molecular material has optical performance, and when a micropattern of a high orientation and high ordered aggregate of this molecule of organic molecular material is formed on a substrate, the pattern can be utilized for light functional elements such as optical waveguide, non-linear optical element, optical integrated circuit and the like.

BRIEF DESCRIPTION OF THE DRAWINGS

FIGS. 1(A), (B), (C), (D) and (E) are explanatory views showing the sequential step of forming a pattern aimed at with heterogeneous ionic materials on an ionic single crystal substrate by using lithography and epitaxial growth method, irradiating beams of molecular material, and forming a two-dimensional microstructure and a three-dimensional microstructure;

FIGS. 2(a), (b), (c) and (d) are explanatory views showing the sequential step of another embodiment of the present invention;

FIG. 3 is a graph showing difference of growth rate by substrate material and substrate temperature in epitaxial growth of VOPc; and FIGS. 4(a) and 4(b) are sketches of photographs showing 25 layers and 50 layers of VOPc, respectively, as a KCl pattern on a LiF substrate.

Throughout different views of the drawing in FIGS. 1–4, 1 is an ionic material single crystal substrate, 2 is a single crystal pattern of heterogeneous ionic material formed on the substrate, 3 is a molecular material pattern, 3a is a molecular material beam, 4 is a two-dimensional microstructure consisting of a high orientation aggregate of molecular material having optical functionability, 5 is a three-dimensional microstructure consisting of the same high orientation aggregate, 6 is single crystal substrate of LiF, 7 is a metal mask, 8 is a mask opening portion, 9 is a KCl molecular beam irradiation, 10 is a pattern drawn with ultra-thin film of KCl single crystal andll is VOPc pattern selectively grown on a VOPc epitaxial thin film.

DESCRIPTION OF THE PREFERRED EMBODIMENTS

The sequential steps of a method of forming a microstructure pattern of the present invention will be explained by referring to FIGS. 1–5.

FIG. 1(A) is a diagram showing a single crystal substrate of ionic material, on the surface of which is formed a clean surface. In this case, a KCl single crystal was formed on the substrate by cleaving.

FIG. 1(B) is a diagram showing how to form an object fine pattern 2 with heterogeneous ionic material by using lithography and epitaxial growth method. Actually speaking, a resist agent is applied onto a KCl substrate to form a mask which aimed portion is opened by exposure and development of pattern. LiF as another ionic material is epitaxially grown thereon, and thereafter the mask was peeled off.

FIG. 1(C) is a diagram showing the substrate of the structure obtained in the previous step shown in FIG. 1(B), to which beams of molecular material 3 aimed at are uniformly irradiated. In this case, molecular material is selectively crystallized only one surface of materials for constructing a substrate by maintaining the substrate at a certain temperature determined by combination of materials. Actually speaking, beams of vanadium oxide phthalocyanine were irradiated at about 80° C. When the substrate is maintained in vacuo at a certain temperature determined by combination of materials and beams of the molecular material (such as VOPc) 3 are uniformly irradiated, epitaxial growth selectively occurs in only one of materials for constructing the substrate.

FIG. 1(D) shows a two-dimensional microstructure 4 consisting of a high orientation aggregate of molecular material having optical functionability formed on the substrate 1.

FIG. 1(E) shows a state of the structure formed in the step of FIG. 4 by further epitaxially growing material on the substrate 1. A three-dimensional microstructure 5 was formed by returning to the step shown in FIG. 1 and repeating the same process.

FIGS. 2(a), (b), (c) and (d) are diagrams showing another embodiments of using an LiF single crystal for the substrate, irradiating KCl molecular beam thereto, and epitaxially growing a thin film on the LiF Single crystal.

FIG. 2(a) is a diagram showing epitaxial growth on a LiF single crystal substrate 6 by cleaving a LiF single crystal at (001) plane, forming a clean surface on the surface thereof, arranging a metal mask 7 having an opening 8 thereon, and irradiating KCl molecular beam 9 as another ionic material.

FIG. 2(b) is a diagram showing a state of obtaining a pattern 10 drawn with a single crystal ultrathin film of KCl on the LiF single crystal substrate 1 at the previous step.

FIG. 2(c) is a diagram showing a state of irradiating molecular beams 12 of VOPc by maintaining the substrate 1 at 55° C.

FIG. 2(d) is a diagram showing a state of selectively growing an epitaxial film of VOPc on a pattern 10, and growing a film 11 of VOPc. Here, VOPc makes high orientation epitaxial growth by arranging crystallographic axes with respect to KCl.

FIG. 3 is a graph showing a growth amount (obtained from the light absorption spectrum of 600-900 nm) when VOPc is irradiated on three kinds of ionic material substrates such as KBr, KCl, LiF under different substrate temperatures at a certain molecular beam strength for a certain time. There were shown largely different growth amounts of KCl and LiF in the vicinity of 50°–70° C. This difference is estimated to become further larger by improving flatness of the substrate surface, uniformity of the substrate temperature and the like.

FIGS. 4(a) and 4(b) are photographs showing states of coating 25 layers of VOPc (see FIG. 4(a)) and 50 layers of VOPc (see FIG. 4(b)) on the LiF substrate as shown in FIGS. 2(a), (b), (c) and (d). In the photographs of FIGS. 4(a) and 4(b), there was clearly observed VOPc only at a semicircular portion where KCl was grown. As apparent from FIGS. 4(a) and 4(b), VOPc is selectively grown on KCl at a substrate temperature 55° C., and VOPc is patterned. It was confirmed that VOPc is epitaxially grown by arranging crystallographic axes with respect to KCl, and patterning of the high orientation (epitaxial) structure of VOPc was obtained.

The above stated embodiments are processed in mm unit for the sake of mask manufacture, but the present invention utilizes the crystal growing mechanism of heteroepitaxy of molecular crystals, and advantageously completes small dimension such as less than several ten μm, there is theoretically no lower limit of processing dimension (one molecule), and it is an industrial advantage to be determined by the dimension of a pattern drawn on an ionic material substrate.

In order to draw a fine pattern of less than 1 μm by using different materials, there is taken a method of applying an organic high molecular resist onto a substrate, transcribing a desired pattern by the same technique as that of photograph, developing and manufacturing an opening portion at present. However, this technique is only utilized for inorganic material, and if a pattern is formed by epitaxially growing a molecular crystal thereon, bonding between the substrate and the molecular crystal is as weak as bonding between the substrate and the resist, so that the molecular crystal is disadvantageously peeled off together with the resist in case of peeling the resist off.

According to the method of the present invention, ionic bonding between ionic crystals becomes strong apart from bonding with the resist, a pattern obtained by epitaxial growth through the opening portion can advantageously peel the resist without destroying the pattern.

According to the present invention, a microstructure can be formed with molecular material having high crystalline order represented by single crystal. The method of the present invention does not directly process an aggregate of a molecular material, and has advantages of avoiding limitation of chemical stability and reactivity, which have hitherto been the problems, and theoretically limitlessly using any kind of molecular materials to be treated. There is further an advantage of enabling to imparthigh crystalline order to the molecular in a microstructure, which was impossible until now.

We claim:

1. A method of forming a microstructure pattern of a high orientation aggregate of a molecular material with the aid of difference of growth rate with substrate material comprising:

the first step of forming a microstructure pattern singly crystallized another ionic material having different ionic bondability thereon by lithography and epitaxial growth on ionic material single crystal substrate material, and the second step of forming a microstructure pattern of a high orientation aggregate of an organic molecular material on a single crystal substrate of an ionic material by carrying out epitaxial growth of an objective organic molecular material, while maintaining a substrate temperature of the molecular material aiming at coating, in the pattern manufactured in said step, at the optimum temperature for growing on substrate material or either one of grown ionic materials determined by combination of materials, and scarcely growing on the other ionic material.

2. A method of forming a microstructure pattern of a high orientation aggregate of a molecular material with the aid of difference of crystal growth rate by substrate material comprising:

the first step of forming a microstructure pattern singly crystallized another ionic material having different ionic bondability thereon by lithography and epitaxial growth on a single crystal substrate material of an ionic material, the second step of forming a microstructure pattern of a high orientation aggregate of an organic molecular material on a single crystal substrate of an ionic material by carrying out the epitaxial growth of an objective organic molecular material, while maintaining a substrate temperature of the molecular material aiming at coating, at the optimum temperature for growing on substrate material or either one of grown ionic materials determined by combination of materials, in the pattern formed in said step, thereby scarcely growing the other material on said material, and the third step of repeating said step of coating ionic material and molecular material on the microstructure pattern of said molecular material by epitaxial growth and forming three-dimensional structure.

* * * * *

UNITED STATES PATENT AND TRADEMARK OFFICE
CERTIFICATE OF CORRECTION

PATENT NO. : 5,738,720
DATED : April 14, 1998
INVENTOR(S) : Shimada, et al

It is certified that error appears in the above-identified patent and that said Letters Patent is hereby corrected as shown below:

Claims 1 and 2, should be deleted and substituted with the following claims:

1. A method of forming a microstructure pattern of a high orientation aggregate of a molecular material with the aid of a difference of growth rate with a substrate material comprising:

a [the] first step of forming a microstructure pattern singly cyrstallized another ionic material having a different ionic bondability thereon by lithography and epitaxial growth on an ionic material single crystal substrate material, and a [the] second step of forming a microstructure pattern of a high orientation aggregate of an organic molecular material on a single crystal substrate of an ionic material by carrying out epitaxial growth of an objective organic molecular material, while maintaining a substrate temperature of the molecular material aiming at coating, in the pattern manufactured [in] said step, at the optimum temperature for growing on the substrate material or either one of grown ionic materials determined by a combination of materials, and scarcely growing on the other ionic material.

UNITED STATES PATENT AND TRADEMARK OFFICE
CERTIFICATE OF CORRECTION

PATENT NO. : 5,738,720
DATED : April 14, 1998
INVENTOR(S) : Shimada, et al

It is certified that error appears in the above-identified patent and that said Letters Patent is hereby corrected as shown below:

2. A method of forming a microstructure pattern of a high orientation aggregate of a molecular material with the aid of <u>a</u> difference of crystal growth rate by <u>a</u> substrate material comprising:

<u>a</u> [the] first step of forming a microstructure pattern singly crystallized another ionic material having <u>a</u> different ionic bondability thereon by lithography and epitaxial growth on a single crystal substrate material of an ionic material, <u>a</u> [the] second step of forming a microstructure pattern of a high orientation aggregate of an organic molecular material on a single crystal substrate of an ionic material by carrying out [the] epitaxial growth of an objective organic molecular material, while maintaining a substrate temperature of the molecular material aiming at coating, at the optimum temperature for [growing] <u>growth</u> on <u>the</u> substrate material or either one of grown ionic materials determined by <u>a</u> combination of materials, in the pattern formed in said step, thereby [scarcely growing] the other material <u>is scarcely grown</u> material, and

UNITED STATES PATENT AND TRADEMARK OFFICE
CERTIFICATE OF CORRECTION

PATENT NO.  : 5,738,720
DATED       : April 14, 1998
INVENTOR(S) : Shimada, et al It is certified that error appears in the above-identified patent and that said Letters Patent is hereby corrected as shown below:

a [the] third step of repeating said step of coating the ionic material and molecular material on the microstructure pattern of said molecular material by epitaxial growth and forming a three-dimensional structure.

Signed and Sealed this

Sixteenth Day of February, 1999

Attest:

Attesting Officer

Acting Commissioner of Patents and Trademarks